United States Patent [19]
Kwun

[11] Patent Number: 6,134,947
[45] Date of Patent: Oct. 24, 2000

[54] LOAD SENSOR FOR MEASURING ENGINE CYLINDER PRESSURE AND SEAT OCCUPANT WEIGHT

[75] Inventor: Hegeon Kwun, San Antonio, Tex.

[73] Assignee: Southwest Research Institute, San Antonio, Tex.

[21] Appl. No.: 08/928,051

[22] Filed: Sep. 12, 1997

[51] Int. Cl.[7] .............................. G01L 1/12; G01M 15/00
[52] U.S. Cl. .......................... 73/35.12; 73/116; 324/393; 280/735; 340/667
[58] Field of Search ................................. 73/35.07, 35.12, 73/115, 116, 117.3; 324/393; 280/735; 340/665, 666, 667

[56] References Cited

U.S. PATENT DOCUMENTS

| | | | |
|---|---|---|---|
| 2,879,450 | 3/1959 | Baker | 315/58 |
| 4,494,401 | 1/1985 | Dobler et al. | 73/714 |
| 4,602,506 | 7/1986 | Sawamoto et al. | 73/115 |
| 4,686,861 | 8/1987 | Morii | 73/115 |
| 4,898,024 | 2/1990 | Takeuchi | 73/115 |
| 4,909,071 | 3/1990 | Amano et al. | 73/115 |
| 5,101,659 | 4/1992 | Takeuchi | 73/115 |
| 5,222,399 | 6/1993 | Kropp | 73/862.68 |
| 5,323,643 | 6/1994 | Kojima et al. | 73/115 |
| 5,392,654 | 2/1995 | Boyle | 73/761 |
| 5,413,378 | 5/1995 | Steffens, Jr. et al. | 280/735 |
| 5,479,817 | 1/1996 | Suzuki et al. | 73/115 |
| 5,570,903 | 11/1996 | Meister et al. | 280/735 |
| 5,573,269 | 11/1996 | Gentry et al. | 280/735 |
| 5,581,019 | 12/1996 | Minor et al. | 73/115 |
| 5,659,132 | 8/1997 | Novak et al. | 73/115 |
| 5,672,812 | 9/1997 | Meyer | 73/35.07 |
| 5,739,757 | 4/1998 | Gioutsos | 280/735 |
| 5,747,677 | 5/1998 | Tomisawa et al. | 73/115 |
| 5,852,245 | 12/1998 | Wesling et al. | 73/DIG. 4 |

Primary Examiner—Eric S. McCall
Attorney, Agent, or Firm—Cox & Smith Incorporated

[57] ABSTRACT

A load sensor for measuring engine cylinder pressure and vehicle seat occupant weight in a nonintrusive manner that is easily adaptable to existing vehicle components and occupancy support structures. The sensor of the invention provides a toroidal-shaped ferromagnetic steel core that defines a hollow space within which an excitation coil and a detection coil are wound. For engine cylinder pressure sensing, this toroidal sensor is placed on a spark plug, much in the nature of a washer, and is clamped between the spark plug and the spark plug seat in the chamber. For seat occupant weight sensing, the sensor is placed under a seat leg around a fastening bolt, again much in the nature of a washer, and is clamped between the bolt and the floor of the vehicle. Changes in the load or force produced by the cylinder pressure or the occupant weight, alters the stress in the steel core of the sensor. These stress changes in turn induce changes in the magnetic properties of the steel core. Non-linear harmonic analysis of the stress induced magnetic property changes is made and derives the cylinder pressure or occupant weight after suitable calibrations. The cylinder pressure measurements can then be used to facilitate an efficient operation of the internal combustion engine through the modification of timing, fuel mixture, etc. The use of the device in conjunction with occupant safety systems would provide a weight value sufficient to characterize the appropriate or inappropriate activation of an air bag system or the like.

7 Claims, 2 Drawing Sheets

LOAD SENSOR FOR MEASURING ENGINE CYLINDER PRESSURE AND SEAT OCCUPANT WEIGHT

BACKGROUND OF THE INVENTION

1. Field of the Invention

The present invention relates generally to sensors for the measurement of force and load. The present invention relates more specifically to an electromagnetic sensing device for measuring changes in force or load through the measurement of stress-induced magnetic property changes. The present invention has specific application in measuring the changes in pressure in internal combustion engine cylinders and measuring seat occupant weight in passenger vehicles.

2. Description of the Related Art

Modern motor vehicles are becoming increasingly "intelligent" in their ability to detect and respond to operating characteristics in a manner that improves the safety and overall efficiency of the motor vehicle. For some time now, microprocessor-based controls have improved the efficiency of automotive engines by automatically adjusting such things as fuel mixture, timing, acceleration, speed, temperatures and a variety of other operating parameters. In addition, electronic controls and sensors have been utilized to handle such items as anti-lock breaking systems, emission controls, air bag deployment, climate controls, and engine maintenance warnings. These improved devices for monitoring and controlling the operation of an automobile, however, have brought with them the need to accurately and quickly detect changes in the operating characteristics of the vehicle. The detection of these characteristics is accomplished by the use of a variety of different sensors that report timing, temperature, pressure, load, wear, and other such quantitative values back to a microprocessor control system for use.

One of the most significant bits of information that can assist the efficient operation of a motor vehicle is an accurate measurement of the changes in the internal pressure for the cylinder combustion chambers in the engine. These changes are directly related to the combustion efficiency and, therefore, the overall efficiency of the motor vehicle. It is quite common to make pressure change measurements in a shop environment where the vehicle spark plugs can be removed and pressure characteristics within a cylinder can be measured. However, on board measurement of cylinder pressure is the more desirable approach for controlling the engine to achieve a higher combustion efficiency. It is only through this real time measurement that microprocessor based systems can adjust various engine functions to improve efficiency in light of various types and levels of pressure change. As an example, such information can be used to adjust ignition timing and the amount of fuel injected for optimum combustion as well as to monitor and control abnormal combustion events such as misfire and knocking.

Various methods and devices for on board sensing of cylinder pressures have been developed in the automotive industry. A number of such methods involve opening a whole in a spark plug or in the combustion chamber wall itself to provide a channel for the cylinder pressure to be transmitted to a detection location outside of the chamber or within the chamber wall. The actual gas pressure at the detection location is then measured by using a suitable pressure sensor. Other methods utilize annular piezoelectric pressure sensors that are clamped like washers between a spark plug and the spark plug seat in the chamber. Other applications of piezoelectric transducers include mounting the washer-like sensor to an engine head bolt where force changes can be measured and cylinder pressures can be inferred. Each of these latter methods, however, sense cylinder pressure changes indirectly since they rely on detecting clamping force changes caused by displacements of the spark plug or the engine head bolt that are due to cylinder pressures exerted on these engine components. This latter method of bolting a sensor to a critical engine component is preferred to the first method of opening a port because it is much less intrusive into the operating system of the engine. On the other hand, because it utilizes a piezoelectric element which is brittle and temperature sensitive, this latter sensing method has shown technical difficulties in achieving suitable durability and reliability. This is especially true for onboard operation where continuous temperature and vibration effects cause rapid deterioration and failure for such piezoelectric elements. The following patents disclose various sensor systems for detecting and measuring pressure changes in internal combustion engine cylinders: U.S. Pat. No. 2,879,450, issued in March 1959 to Baker; U.S. Pat. No. 5,101,659, issued to Takeuchi in April 1992, entitled "Mounting Device for Pressure Sensor"; U.S. Pat. No. 4,602,506, issued to Sawamoto et al. in July 1986, entitled "Combustion Pressure Sensor Arrangement"; U.S. Pat. No. 4,909,071, issued to Amano et al. in March 1990, entitled "Spark Plug Pressure Sensor"; U.S. Pat. No. 5,323,643, issued Kojima et al. in June 1994, entitled "Device for Detecting Change in Internal Pressure of Cylinder"; and U.S. Pat. No. 5,479,817, issued to Suzuki et al. in January 1996, entitled "Spark Plug With Build-In Pressure Sensor".

In terms of safety operations in a motor vehicle, many advances have been made in recent years towards improving the activation of safety devices when the vehicle is involved in a collision. The use of air bags in automotive vehicles to protect front seat occupants during a crash event has become standard in the industry. When activated, air bags are designed to inflate at a speed of up to 200 mph. Although this deploys the air bag in a time period sufficient to prevent the occupant from impacting components within the vehicle, this high inflation rate can impart a severe blow to the occupants in the process. This impact can be fatal if the occupant is an infant, child or small adult. There is a need, therefore, to distinguish between occupants in the front seat of a vehicle that are capable of handling the impact of an air bag and those that would be better served by other safety devices such as simple seatbelt systems. On concept being considered in the automotive industry to address the problem is the development of smart air bag systems that automatically deactivate the air bag when an infant, child or small adult is riding in the front seat. The key to implementing this approach is to accurately identify whether the front seat occupant requires air bag deactivation. The single factor most suitable for accomplishing this identification or classification of the occupant is the occupant's weight. There is, therefore, a need for a reliable and inexpensive weight sensor that can be used in association with air bag activation/deactivation systems. The following patents describe systems that have made attempts at identifying the presence and character of the occupant riding in the front seat of a vehicle and automatically deactivating the air bag as a result. These patents include: U.S. Pat. No. 5,413,378, issued to Steffens et al. in May 1995; U.S. Pat. No. 5,570,903, issued to Meister et al. in November 1996; and U.S. Pat. No. 5,573,269, issued to Gentry et al. in November 1996.

In each of the instances described above, there is a need for a sensor to measure force values associated with the efficient operation and the safe operation of the motor vehicle. In both cases, a sensor that can measure forces accurately and is durable over the long operational life of the motor vehicle would be desirable. Such a sensor would preferably be nonintrusive, i.e., would require very little modification to the existing engine and vehicle structure in order to implement, and rugged in that it should easily stand up to the temperature and vibration extremes associated not only with a vehicle engine, but with the structure for vehicle occupant support. The sensor device should also work easily in conjunction with existing monitoring and control systems currently being utilized for such vehicle safety and efficiency operations.

SUMMARY OF THE INVENTION

It is therefore an object of the present invention to provide a sensor capable of non-intrusively measuring the internal combustion pressures associated with a cylinder in a vehicular engine and relaying this pressure information to a controller device that might modify engine operational parameters in response to these pressure changes.

It is a further object of the present invention to provide a sensor capable of measuring forces that result from differences in the weight of an occupant in a motor vehicle and relaying this information to a controller device for activating or deactivating passive restraint systems such as air bag deployment mechanisms.

It is a further object of the present invention to provide a sensor for measuring forces in both combustion cylinders and in passenger support systems in a manner that requires little modification of the existing structures in the vehicle.

It is a further object of the present invention to provide a sensor capable of measuring force changes in internal combustion engines and occupant support structures that is durable and reliable in the face of temperature and vibrational extremes such as might be experienced in the operation of an automotive vehicle.

It is a further object of the present invention to provide a sensor capable of measuring force changes in internal combustion engines and in occupant support structures that is accurate and reliable and is not subject to erroneous measurements as a result of extraneous interferences from other operational functions in the motor vehicle.

It is a further object of the present invention to provide a method for quantitatively characterizing cylinder pressure or occupant weight in a motor vehicle through the use of non-linear harmonic analysis for sensing and measuring stress-induced magnetic property changes in a sensor component positioned adjacent to the pressure or weight changes of concern.

It is a further object of the present invention to provide an electromagnetic sensor capable of being mounted in association with standard spark plug devices and in association with standard bolting devices much in the nature of a washer in conjunction with these devices so as not to require further modification of the components to which the sensor is being attached.

It is a further object of the present invention to provide an electromagnetic sensor structure that is simple in configuration, has no moving parts, and is easily sealed against environmental effects.

In fulfillment of these and other objectives, the present invention provides a load sensor for measuring engine cylinder pressure and vehicle seat occupant weight in a nonintrusive manner that is easily adaptable to existing vehicle components and occupancy support structures. The sensor of the present invention provides a toroidal-shaped ferromagnetic steel core that defines a hollow space within which an excitation coil and a detection coil are wound. For engine cylinder pressure sensing, this toroidal sensor is placed on a spark plug, much in the nature of a washer, and is clamped between the spark plug and the spark plug seat in the chamber. For seat occupant weight sensing, the sensor is placed under a seat leg around a fastening bolt, again much in the nature of a washer, and is clamped between the bolt and the floor of the vehicle. Changes in the load or force produced by the cylinder pressure or the occupant weight, alters the stress in the steel core of the sensor. These stress changes in turn induce changes in the magnetic properties of the steel core. Non-linear harmonic analysis of the stress induced magnetic property changes is made and derives the cylinder pressure or occupant weight after suitable calibrations. The cylinder pressure measurements can then be used to facilitate an efficient operation of the internal combustion engine through the modification of timing, fuel mixture, etc. The use of the device in conjunction with occupant safety systems would provide a weight value sufficient to characterize the appropriate or inappropriate activation of an air bag system or the like.

Other objectives and uses of the present invention will be made obvious to those skilled in the art after a reading of the specifications below and the appended claims.

DETAILED DESCRIPTION OF THE PREFERRED EMBODIMENT

The present invention defines an electromagnetic sensor capable of measuring forces of either a compressive or tensile nature that are exerted on materials with which the sensor has rigid contact. While load and force sensors are often adapted for use in very specific conditions and for very particular measurements, it is anticipated that the sensor of the present invention could be widely applied in a large variety of instances where non-intrusive force and load measurements might be required. The structure and function of the sensor of the present invention lends itself most specifically to use in situations where bolts or other attachment devices are subjected to changes in force that need to be measured. Two of the most apparent instances in the operation and function of a motor vehicle are the forces experienced by a spark plug device which, like a bolt, is rigidly attached to an internal combustion cylinder. Likewise, bolts that are utilized to attach support structures for vehicle occupants will experience the changes in force that relate to the weight associated with the occupants in the vehicle. These two situations, therefore, lend themselves to the use of the sensor of the present invention. Other sensors that have been utilized to address the problems associated with occupant safety and motor vehicle efficiency have heretofore not entirely succeeded in providing reliable and accurate weight and pressure information over the expected lifetime of the vehicle.

Therefore, while the structure and function of the sensor of the present invention is described specifically in conjunction with its use for internal combustion chamber pressures and occupant weight monitoring systems, it is anticipated that the sensor structure could easily be used in a number of other applications within a motor vehicle that require measurements associated with force changes. In any situation where weight becomes a factor in modifying the operation or function of a vehicle, the present sensor could be utilized. In any situation where variations in pressure indicate operational characteristics of the vehicle, use of the present sensor would be applicable.

Figure 1:
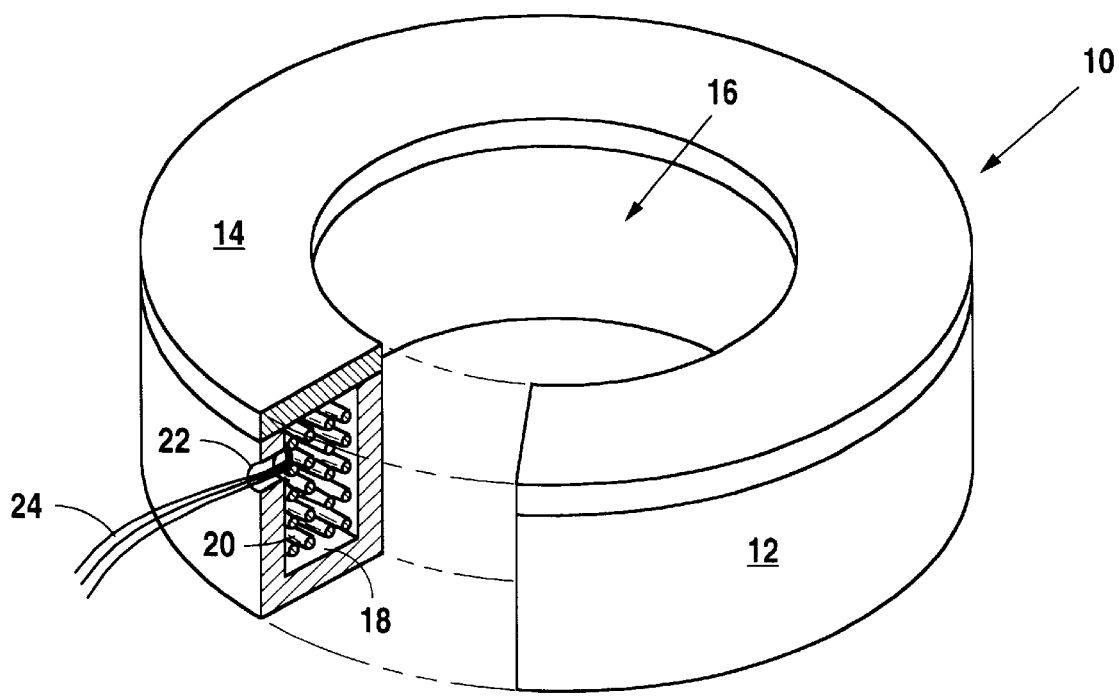
FIG. 1 is a perspective, partial cut-away view, of the sensor device of the present invention.

Reference is made first to FIG. 1 for a detailed description of the structure of the basic sensor element of the present invention. Sensor (10) is comprised of two primary elements; first, a steel core and second, a pair of electromagnetic coil windings. The steel core is comprised of base ring (12) and top washer (14). Base ring (12) is a round ring with a U-shaped cross-section and top washer (14) is a flat washer-shaped plate that may be placed on base ring (12) to close and define hollow space (18) within which coils (20) may be placed. Together, base ring (12) and top washer (14) define cylindrical opening (16) through which the bolt or spark plug may be passed. Coils (20), as described in more detail below, terminate in wires (24) which pass through aperture (22) in the wall of base ring (12). Base ring (12) and top washer (14) are preferably constructed of steel material, but other ferromagnetic materials might lend themselves to specific applications where temperature or environmental conditions dictate. The primary concern is that the material from which base ring (12) and top washer (14) are constructed will provide sufficient structural stability to sensor (10) and also provide appropriate magnetic characteristics that can be detected by coils (20) of the present invention.

Figure 2:
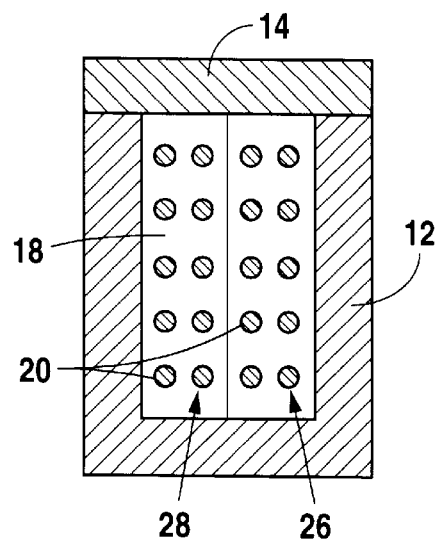
FIG. 2 is a cross-sectional view of the internal structure of the sensor device of the present invention.

FIG. 2 shows in greater detail the cross-sectional structure of sensor device (10) disclosed in FIG. 1. In this view, the U-shaped cross-section of base ring (12) can be seen as it defines the hollow space (18) within which coils (26) and (28) are placed. Top washer (14) has a simple rectangular, flat cross-section that closes off hollow space (18) within which coils (26) and (28) are placed.

The coils in this case comprise detection coil (26) and excitation coil (28). The use and function of these coils is described in more detail below, but essentially they are positioned so as to create and detect magnetic fluctuations within the core defined by base ring (12) and top washer (14).

The device of the present invention is constructed by positioning coils (26) and (28) within hollow space (18) of base ring (12) and adhering top washer (14) to the top of base ring (12) in manner that seals the coils within. The two parts, base ring (12) and top washer (14), of the device are joined together by adhesive bonding or tack welding in a manner that permanently seals coils (26) and (28) within the sensor. As indicated above with respect to FIG. 1, coils (26) and (28) terminate in wires (24) which are directed away from the sensor through aperture (22) in the wall of base ring (12).

For engine cylinder pressure sensing, the sensor device is placed on a spark plug with the spark end of the plug going through center hole (16) of the sensor. The device is then clamped like a washer between the spark plug and the spark plug seat and the combustion chamber. The load or force produced by the cylinder pressure alters the level of stress in the side wall of the sensor. These stress changes in turn produce changes in the magnetic properties of the steel core.

For seat occupant weight sensing, the device is placed under a seat leg around a fastening bolt and is clamped between the bolt and the floor of the automobile. As with the cylinder pressure sensing, the location of the sensor is appropriate for experiencing the force changes brought about by variations in the weight of the occupant in the seat. In each case described, there will be a base line clamping force associated with the initial installation of the sensor, either on a spark plug or in conjunction with a bolt. It is acknowledged that this baseline clamping force will change over time in a manner unrelated to either the pressure in the cylinder or the weight variations in the seat. These baseline changes, however, will be long-term and will not relate to the "sudden" variations in force that are indicative of actual cylinder pressure variations and seat occupant weight variations. It is therefore, the short-term changes in stress that are measured rather than long-term variations in the clamping force.

As indicated above, the load or force produced by the cylinder pressure or the occupant weight alters the level of stress in the sidewalls of the steel core. These stress changes in turn produce changes in the magnetic properties of the steel core. In the preferred embodiment of the present invention, an approach called non-linear harmonics (NLH) is used to sense and analyze the stress-induced magnetic property changes which are in turn related to the cylinder pressure or occupant weight. These changes can be accurately determined after a suitable calibration of the device is made. A description of the non-linear harmonic analysis approach may be found in the following publications: H. Kwun and G. L. Burkhardt, "Nondestructive Measurement of Stress in Ferromagnetic Steels Using Harmonic Analysis of Induced Voltage," *NDT Int.,* V. 20, pp. 167–171 (1987), and H. Kwun and G. L. Burkhardt, "Electromagnetic Technique for Residual Stress Measurements", *Metals Handbook,* V. 17, *Nondestructive Evaluation and Quality Control* ASM International, (1989), pp. 159–163. These descriptions are cited as indicative of the state of the art in NLH analysis.

Figure 3:
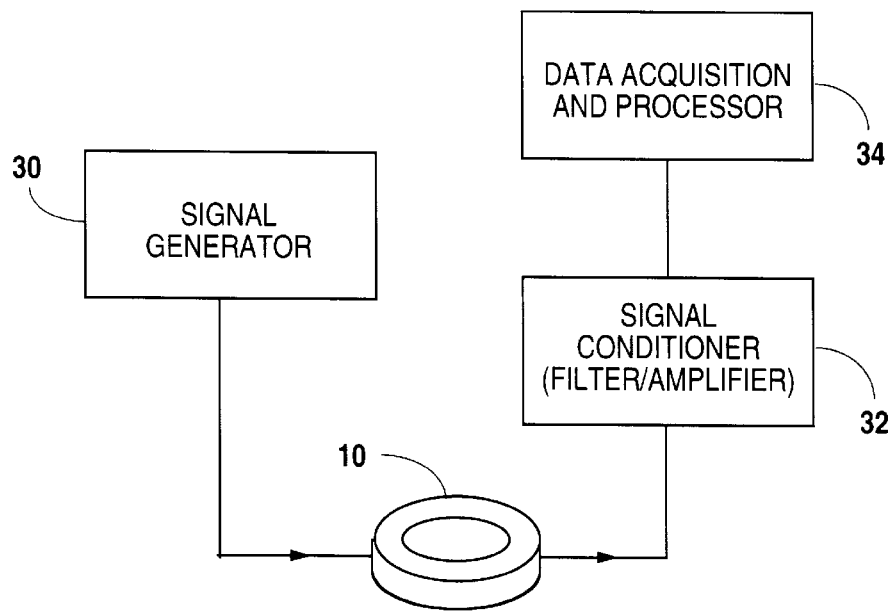
FIG. 3 is a schematic block diagram showing the essential components of a system incorporating the sensor device of the present invention.

The NLH method involves; (1) applying an alternating magnetic field to a material by supplying an alternating electric current to an excitation coil, (2) detecting the magnetic response of the material by using a detection coil, and (3) extracting the non-linear harmonic components (typically, the third harmonic of the applied field frequency) from the detected signal. The electronic instrumentation required for implementing the NLH method as described is disclosed in FIG. 3. Signal generator (30) provides the alternating magnetic field (alternating electric current) to the sensor (10) of the present invention by way of the excitation coil described above. The detection coil detects the magnetic response of the material and communicates this in an electric signal to signal conditioner (32). Signal conditioner (32), in conjunction with data acquisition and processor (34) extracts the non-linear harmonic components necessary to identify and distinguish the force change characteristics.

Figure 4:
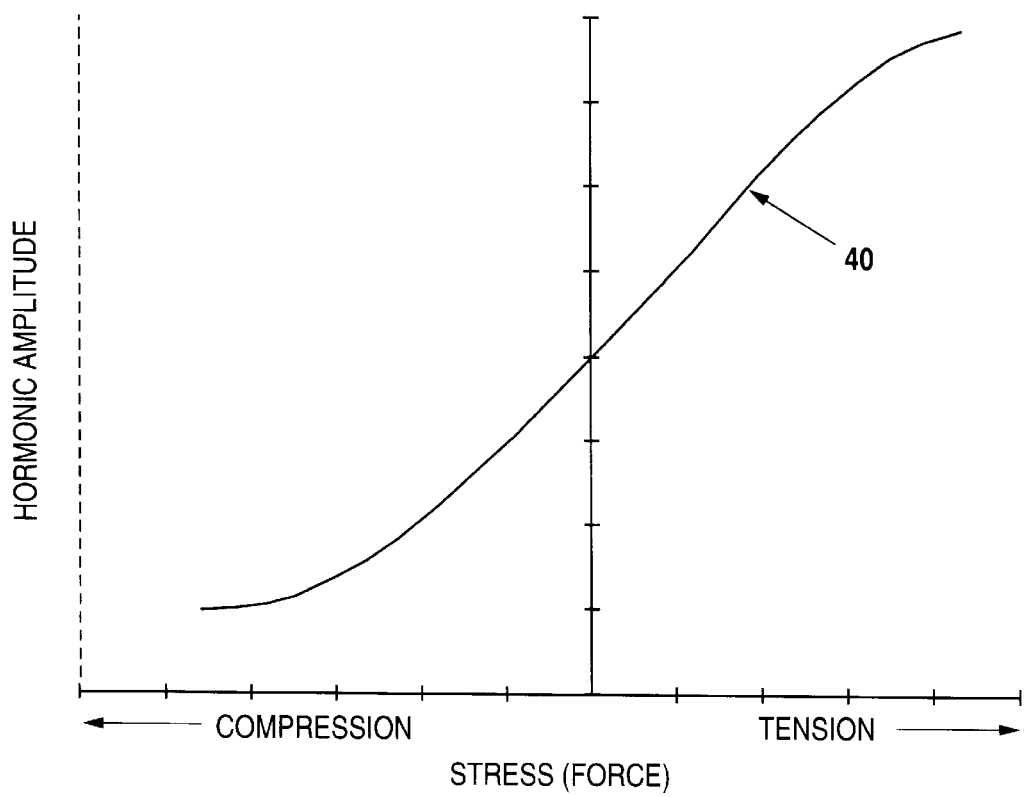
FIG. 4 is a graphical representation of the relationship between harmonic amplitudes and compressive and tension stresses in a material.

Non-linear harmonics are produced because of the magnetic hysterecis and non-linear magnetic permeability. The stress applied to a material alters the magnetic hysterecis and permeability of the material and thus influences the amplitude of the NLH. In steel, NLH amplitude typically increases with increasing tension and decreases with increasing compression as is illustrated in FIG. 4 on plot (40). The amount of change in the NLH amplitude per unit of stress depends upon the material properties of the ferromagnetic material. The actual sensitivity of the device of the present invention to the pressure or weight is a function of the properties of the steel core material and the physical size of the steel core. In particular, the diameter and the sidewall thickness for the steel core will determine the sensitivity of the device. The core material and the size of the core are chosen to meet both sensor sensitivity requirements and mechanical strength requirements according to its particular use.

In any event, because the sensor device is intended to measure fluctuations and changes in pressure or weight, it is not so important that an empirical relationship between the actual weight and the magnetic field be identified. What is critical is the establishment of threshold values based upon calibrated sensors that will trigger control activities in the case of either the engine function or the air bag activation.

As indicated above, it is anticipated that the sensor structure of the present invention will have applicability in other motor vehicle systems apart from the two described herein. In addition, it is anticipated that the sensor structure of the present invention could have applicability in a variety of non-vehicular environments where the measurement of localized changes in force or pressure is required. The sensor's structure and function permit the measurement of forces in a non-intrusive manner primarily due to its structure as a washer-like addition to a bolt or other attachment device. The ruggedness of the internal structure of the present invention makes the sensor useful in a variety of environments that would otherwise not be appropriate for typical piezoelectric sensors and the like.

I claim:

1. A sensor device for measuring changes in a clamping force exerted on said device, said sensor device comprising:
    a toroidal-shaped ferromagnetic core, said core having an inner cylindrical wall and an outer cylindrical wall and defining an internal volume between said cylindrical walls, said inner cylindrical wall further defining a central, coaxial, cylindrical hole in said toroidal-shaped ferromagnetic core;
    an electromagnetic excitation coil positioned within said internal volume of said ferromagnetic core between said cylindrical walls and coaxial with said hole, said electromagnetic excitation coil for generating an alternating magnetic field within said ferromagnetic core when said coil is subjected to an alternating electric current; and
    an electromagnetic detection coil positioned within said internal volume of said ferromagnetic core adjacent to said excitation coil between said cylindrical walls and coaxial with said hole, said electromagnetic detection coil for detecting a magnetic field response within said ferromagnetic core.

2. The device of claim 1, wherein said ferromagnetic core comprises:
    an open ring, said open ring having a U-shaped cross-section and defining a circular groove for receiving said excitation coil and said detection coil; and
    a circular washer sized and positioned on said ring, said circular washer serving to close said circular groove as to form said internal volume.

3. The device of claim 1 having a geometry and size suitable for use in conjunction with standard-sized spark plug devices, wherein said device is positioned between said spark plug device and a spark plug seat on an internal combustion engine.

4. The device of claim 1, having a geometry and size appropriate for use in conjunction with bolts for the attachment of vehicular occupant seat support systems, wherein said device is sized to receive one of said attachment bolts through said central hole in said toroidal core, said device and said attachment bolt being positioned between said seat support system and a floor structure of said vehicle and serving to measure force changes brought about by occupancy weight variations.

5. A method for measuring changes in a clamping force exerted on a material, said method comprising:
    applying an alternating magnetic field to said material by supplying an alternating electric current to an excitation coil positioned adjacent said material, said field having a field frequency;
    detecting a magnetic response of said material by measuring an electric voltage induced in a detection coil positioned adjacent said material;
    extracting non-linear harmonic components of said applied field frequency from said detected magnetic response; and
    correlating a magnitude of said non-linear harmonic components with quantitative changes in said clamping force.

6. The method of claim 5, wherein said step of extracting non-linear harmonic components of said applied field frequency comprises extracting the third harmonic of the applied field frequency.

7. The method of claim 6, wherein said step of extracting non-linear harmonic components of said applied field frequency further comprises extracting the fundamental frequency and other frequency components as a means for enhancing force measurement accuracy.

* * * * *